United States Patent
Speegle

(10) Patent No.: US 10,003,468 B1
(45) Date of Patent: Jun. 19, 2018

(54) METHOD FOR COMMUNICATING OVER DC POWER CONDUCTOR

(71) Applicant: W. Howard Speegle, Florence, AL (US)

(72) Inventor: W. Howard Speegle, Florence, AL (US)

(*) Notice: Subject to any disclaimer, the term of this patent is extended or adjusted under 35 U.S.C. 154(b) by 173 days.

(21) Appl. No.: 14/930,635

(22) Filed: Nov. 2, 2015

Related U.S. Application Data

(63) Continuation-in-part of application No. 14/066,432, filed on Oct. 29, 2013, now Pat. No. 9,319,104, which is a continuation of application No. 13/082,572, filed on Apr. 8, 2011, now Pat. No. 8,570,160.

(60) Provisional application No. 61/395,445, filed on May 13, 2010, provisional application No. 61/322,717, filed on Apr. 9, 2010.

(51) Int. Cl.
*H04L 12/10* (2006.01)

(52) U.S. Cl.
CPC .................... *H04L 12/10* (2013.01)

(58) Field of Classification Search
CPC ....................................... H04L 12/10
USPC ...................................... 307/1, 2, 4
See application file for complete search history.

(56) References Cited

U.S. PATENT DOCUMENTS

| | | | | |
|---|---|---|---|---|
| 4,408,186 A | * | 10/1983 | Howell | H04B 3/54 307/104 |
| 2006/0192434 A1 | * | 8/2006 | Vrla | H02J 7/0042 307/64 |

* cited by examiner

*Primary Examiner* — William Hernandez
(74) *Attorney, Agent, or Firm* — MarkClodfelter

(57) ABSTRACT

A method for communicating over a DC power line is disclosed. A digital stream from any source is applied to a transmitter comprising a DC power regulator, which may be a shunt regulator, and in some embodiments, may be an adjustable Zener diode. The digital stream is applied to a reference input of the regulator, which causes digital fluctuations of a power DC voltage applied to a DC power line upon which downstream receivers are operating. Any number of receivers may be connected to the DC power line, each of which including a microprocessor powered by the digitally fluctuating DC voltage. The receivers may operate on any number of applications. In another embodiment, bidirectional communications are enabled by adding a shunt voltage regulator to vary voltage on the power line for each receiver. Digital communication may operate at relative fast rates, and the transmitter and receiver are inexpensive.

19 Claims, 4 Drawing Sheets

METHOD FOR COMMUNICATING OVER DC POWER CONDUCTOR

CROSS REFERENCE TO RELATED APPLICATIONS

This application is a continuation-in-part of Applicants' pending U.S. patent application Ser. No. 14/066,432, filed Oct. 29, 2013, incorporated herein in its entirety by reference, and which is a continuation of Applicants U.S. patent application Ser. No. 13/082,572, now U.S. Pat. No. 8,570,160, and which is incorporated herein in its entirety by reference, and which claims the benefit of Applicants provisional applications No. 61/322,717, filed Apr. 9, 2010 and 61/395,445, filed May 13, 2010, both of which being incorporated by reference herein in their entireties.

FIELD OF THE INVENTION

The present invention relates generally to communications over a DC power line, and particularly to controlling or monitoring of devices via unidirectional or bidirectional signals sent over DC power conductors that operate the monitored or controlled device or devices.

BACKGROUND OF THE INVENTION

In the design of electronic circuits, there are several reasons to minimize the number of physical connections made between circuit elements that are remotely located from each other. Examples of such remotely situated elements may be home security intrusion sensors, distributed temperature sensors for commercial kitchens or HVAC sensors, fire alarm networks for office and apartment buildings and many other similar applications. In such applications, three or more wires are necessary between a transmitter and remotely located receiver, one to carry a DC power potential, another to carry a corresponding ground or neutral for the DC power potential and one or more signal wires that carry monitoring or control signals. Connections between such remotely situated elements usually involve the use of electro-mechanical connectors such as plugs, sockets, crimp connectors, pin connectors, automotive connectors and the like. These devices are much less reliable than electronic components themselves, and contribute significantly more to failures than the electronics. In harsh environments, such as automotive and trucking environments, vibration can loosen electrical connectors, and water can eventually find its way into a connector and cause corrosion to the point of opening a circuit made by male and female components of a plug and socket. While more tightly controlled, the same can be said about aircraft connectors. Connectors require physical space, and add to the minimum volume in which a circuit can be mounted. In many modern applications, such as fire alarm and security devices, space is at a premium, and the ability to mount a circuit in a smaller package may significantly increase the perceived value of the product.

Connectors have significant cost in comparison with electronic components, and involve additional conductors, usually made of relatively expensive copper. In some instances, connector terminals may be coated with gold or other expensive, non corrosive conductive element to ward off corrosion. Therefore, reducing the number of conductors in a system usually results in the creation of a smaller, less expensive, faster product that lasts longer and may appear more attractive and more valuable to the customer. These factors combine to cause most designers to seek to minimize the number of conductors and connections in new designs.

The concept of transmitting data over power lines is well established and has been in commercial use for more than 50 years, with many different innovations in method and technique being applied to enable the elimination of one or more conductors and associated connectors. Here, the prior art is based on addition of multiple, sometimes bulky and expensive, components in order to inject data onto the power line in an acceptable and accurate manner.

Earliest methods for employing power lines to carry signals used injection of high frequency signals onto an AC power line. In some instances, digital signals were independent of the AC power and in other instances the signal rides on the AC power sine wave. This method is still in popular usage. In the popular X10 system, digital signals are transmitted during the zero crossing of an AC sine wave. Other methods of signal transmission over power lines involve techniques such as reversing polarity of the power supply and return lines in response to the data to be transmitted. While this method works, it is suited only to a class of applications in which it is possible to reverse polarity in this manner. The method also has significant inefficiencies in power transmission due to losses in the driving and receiving circuits. These circuits are also comparatively bulky and expensive and add to overall heating of the circuit. Dallas Semiconductor has developed a so-called one wire bus that uses a data conductor and ground conductor, and is the subject of their U.S. Pat. No. 6,239,732, issued 1998. The Dallas Semiconductor reference has no power supply, but rather harvests energy from the data line for powering the device. Energy of transmitted bits on the data line is used to charge a capacitor, with the charged capacitor powering their microprocessor. The Dallas Semiconductor system requires a relatively large capacitor for energy storage, in addition to other regulating circuitry. This is in contrast to the instant invention, which uses an existing power source and power line to power both a digital transmitter and receiver, and which can transmit data more efficiently and at much faster data rates. As such, their system is the inverse of the method of the instant application, which modulates a power supply voltage to send data.

In view of the foregoing, it is apparent that there is a need for digital communications that can be implemented over DC power conductors using only two conductors, and which can be implemented using a circuit that costs only a few cents.

DETAILED DESCRIPTION OF THE DRAWINGS

With the advent of the microcontroller, particularly those having internal analog measurement capabilities with integrated voltage references, an entirely different method of data transmission has been made possible. Such method is distinguished from all prior art methods of communication by its simplicity, low cost and extremely small volume of components involved in transmission and reception of data. The method that has now been enabled is the ability to measure and extract data from encoded changes of a power voltage powering the device that is performing the measurement. In addition, the internal reference voltage remains unchanged when the operating voltage of the device is varied over a wide range. These two elements are critical to the described technique, which cannot be implemented without their presence. No prior art is based on the presence of these elements, nor does any prior art allow for the reduction in size and cost of encoding and decoding circuit components.

Figure 1:
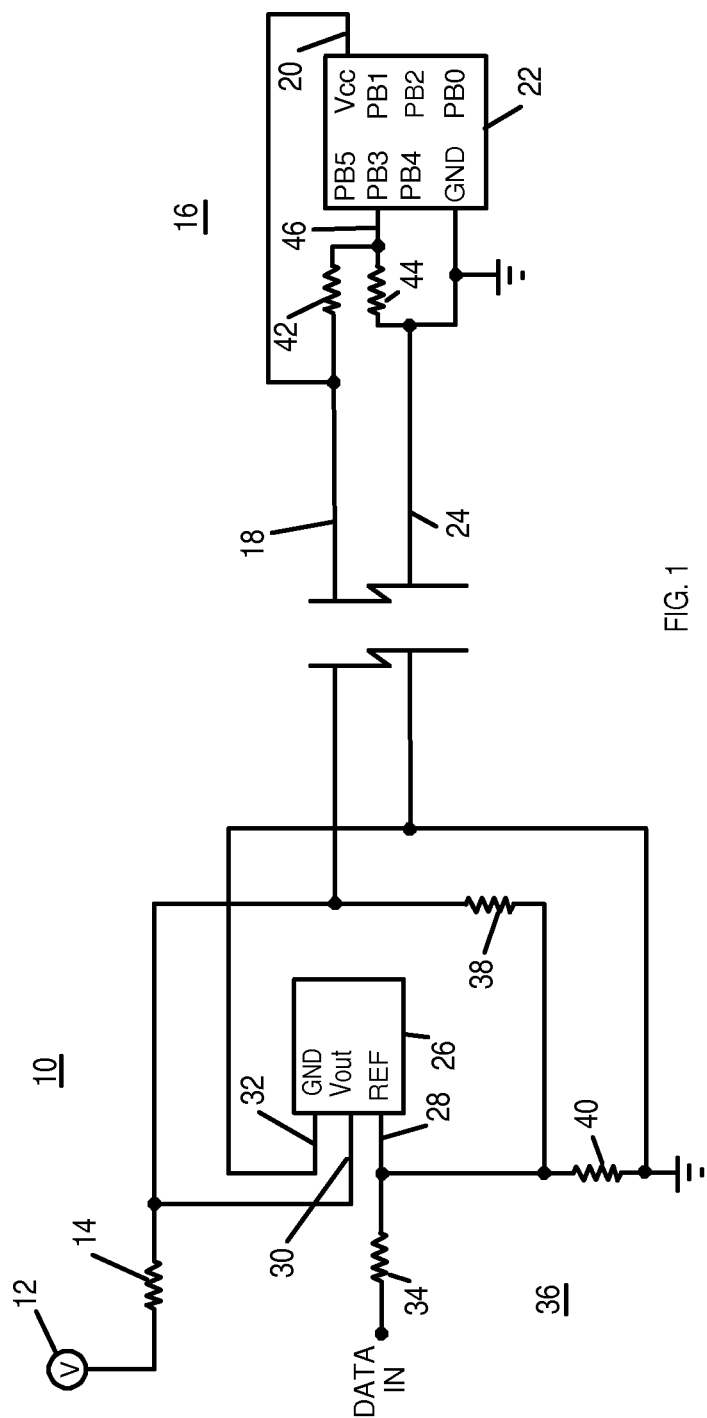
FIG. 1 is a partially block, partially schematic diagram of the instant invention.

Referring to FIG. 1, a partially schematic, partially block diagram is shown. A transmitter 10 of data is powered by an electrical power source 12 via resistor 14, the function of which discussed hereinafter. Power source 12 is conventionally configured to provide a stable positive voltage from about 6 to 9 volts or so to transmitter 10, and to one or more receiver/decoders 16 via associated conductors 18. Here, power conductor 18 carrying DC power from source 12 is coupled to a Vcc input 20 of a microprocessor 22 in receiver 16. A second conductor 24 provides a ground potential for both transmitter 10 and receiver 16. With this construction both transmitter 10 and receiver 16 are powered simultaneously from the same voltage source 12. Transmitter 10 includes a voltage regulator 26, which may be a shunt voltage regulator, and in some embodiments may further comprise an adjustable Zener diode. Where data is only sent to a receiver of the invention, other voltage regulators will work in the transmitter portion. However, when bidirectional communication is desired, only a device that pulls the power voltage down will work In any case, a reference voltage input 28 is provided, and to which a constant DC reference voltage would normally be applied, with regulator 26 regulating voltage at a regulated voltage output 30 thereof to a DC level of the reference voltage on input 28. A value of resistor 14 is selected to limit current from source 12 so that current flow through regulator 26 is selectively drained to ground via ground terminal 32 in order to maintain a voltage level at output 30 to that of the voltage level applied to reference input 28. However, as a feature of the instant invention, rather than a fixed reference voltage being applied to reference input 22, the instant application applies a digital data stream, typically with transitions between 0 volts and 5 volts, to reference input 28 via resistor 34.

Resistor 34, in addition to limiting current of the data stream, is also part of a voltage divider and biasing network 36 formed from resistors 34, 38 and 40. Values of resistors 34, 38 and 40 are selected so that when no data is applied to data input 28, a predetermined minimum voltage level is applied to reference input 28, with a corresponding power voltage level output from output 30. This minimum power voltage output is applied to conductor 18 to provide power at power input 20 of microprocessor 22, for powering microprocessor 22. Such minimum power voltage for microprocessor 22 may be selected to be toward a middle or lower end of a voltage range that is acceptable for powering microprocessor 22 in order to accommodate a 0 volt digital data level applied to reference input 28 of regulator 26 without affecting operation of microprocessor 22. As such, when a digital 1 is applied to reference input 28, which as noted typically may be 5 volts, a corresponding voltage rise on reference input 28 causes the output voltage from output 32 of regulator 26 to rise to a selected voltage level as determined by resistor network 36. This selected voltage level is felt at power input 20 of microprocessor 22, and is within the operational range of microprocessor 22. Likewise, when a digital 0 is applied to reference input 28, more current is sunk to ground by regulator 26, causing a voltage level on conductor 18 to fall to the level as determined by resistor network 36. As such, in some data transmission schemes, such as ASCII, the data voltage level will always be high in the absence of data, and pulled down by the voltage regulator when a logical low voltage level is received, as will be further explained. Other data transmission schemes may also be used, as where a logical low voltage level is present when no data is being transmitted.

In one embodiment, and by way of example only, where an ATtiny 13™ processor is used for processor 22, and which is available from ATMEL Inc., such microprocessor will operate reliably over a power voltage range of 1.8 volts to 5.5 volts applied to the Vcc input to power processor 22. As such, values of resistors of bias and voltage divider network 36 may selected to provide a power voltage of between about 2 to about 4 volts or so when a digital value of 0, represented by 0 volts, is applied to input 28. In noisy electronic environments, a higher power level, such as 4 volts, may be appropriate for a digital 0, while in environments with less electronic noise, a lower voltage may be selected. When a digital 1, which as noted may, by way of example, be a 5 volt logic level, is applied to input 28, increased current is provided from output 30 as regulator 26 adapts to the new voltage reference, with the increased current manifesting itself as a voltage rise at output 30. In the aforementioned case where a 4 volt output represented a digital 0, then a digital 1, represented as a 5 volt logic level, is divided and combined with voltage from source 12 by network 36 to provide a 5 volt reference input to input 28 of regulator 26. This causes a corresponding power voltage rise to 5 volts applied to power input 20 of microprocessor 22. In other words, changing digital data levels applied to input 28 of regulator 26 cause corresponding fluctuating power voltage levels to be applied to power input 20 of microprocessor 22 without affecting operation of microprocessor 22. In this manner, digital signals are transmitted to receiver 16 over power conductor 18 without affecting operation of microprocessor 22. The TINY AT 13™ microprocessor has 6 terminals that may be configured by software to be inputs or outputs (I/O ports), depending on the application. As noted above, one port PB3, which by way of example only, may be used to receive analog data from conductor 18 The remaining I/O ports are used for any application a developer desires, which as noted above may be for monitoring fire alarms and security systems in large buildings, monitoring temperature at different locations, creating a "runway" lighting system in large enclosed areas, such as theaters, wherein sequential LED lamps are sequentially and intermittently illuminated during a power failure or other emergency in order to indicate a direction of an exit, and so forth. The TINY AT 13™ is also provided with a 10 bit analog-to-digital converter, an analog comparator, clock pulse generator, storage registers and other components that make it useful for many applications.

Digital data is detected by microprocessor 22 by first using a voltage divider comprising resistors 42, 44 that provide a 5:1 reduction of voltage so that the digital data voltage levels are reduced. Where the aforementioned 4 volts is used to represent a digital 0 and 5 volts is a digital 1, then corresponding data swings are from 0.8 volts to 1 volt. These digital voltages are provided to input 46 (PB3) of microprocessor 22, in which a voltage threshold at about 0.9 volts is established by software so that any voltage level below 0.9 volts is interpreted as a digital 0 and a voltage level above 0.9 volts is interpreted as a digital 1. An additional hysteresis band may be included in software where desired or necessary.

Figure 2:
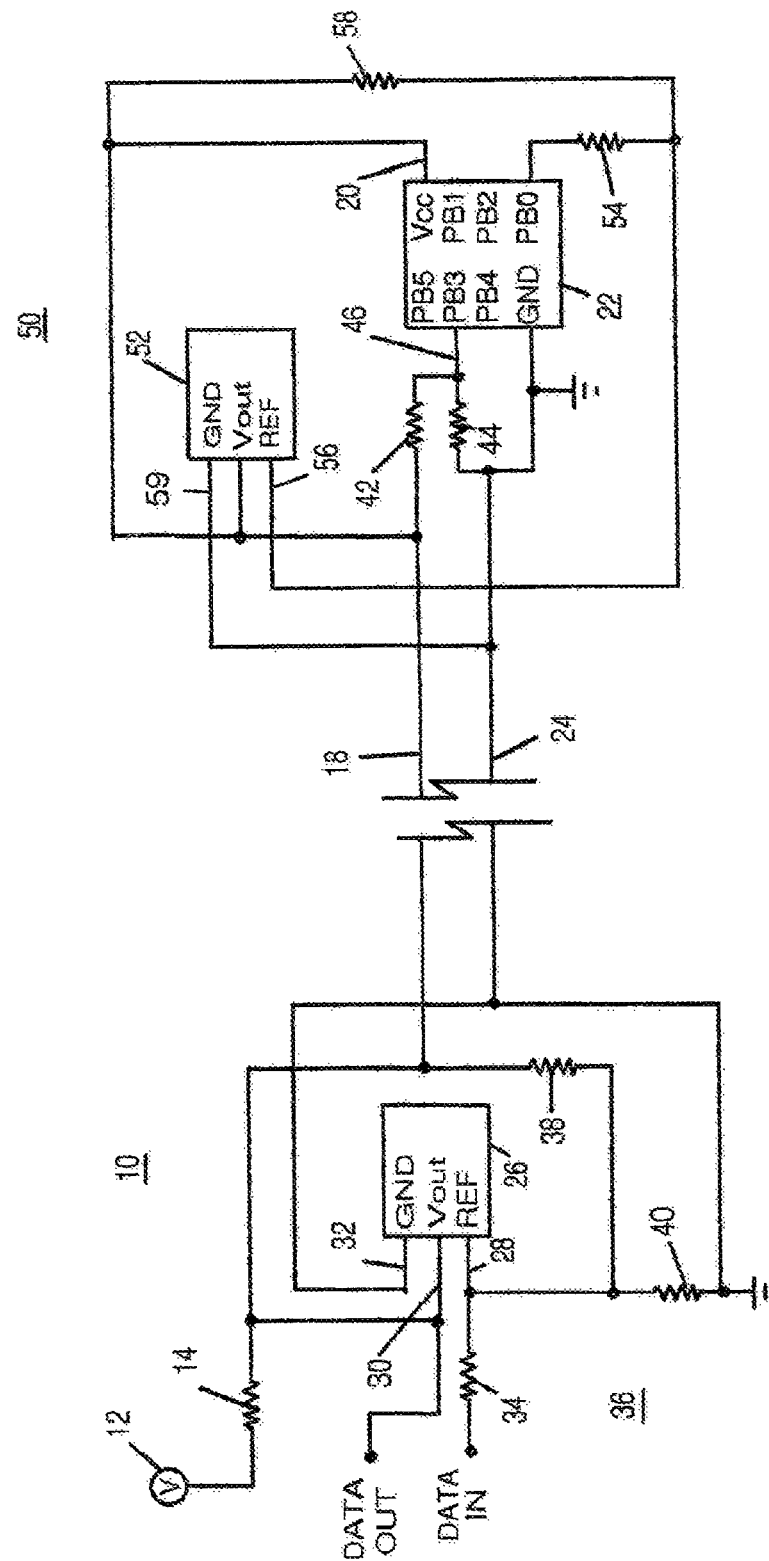
FIG. 2 is a partially block, partially schematic diagram of another embodiment of the instant invention.

Referring now to FIG. 2, an embodiment is shown that implements bidirectional half duplex communication over two conductors between a transmitter 10 and receiver 50. Construction of transmitter 10 is generally as described, but receiver 50 is provided with a second shunt voltage regulator 52. In embodiments where there are multiple voltage regulators, it is necessary to use a shunt voltage regulator, which as noted may be an adjustable Zener diode, in order to prevent contention between the regulators. An output, for example PB0 of microprocessor 22, is connected via a resistor 54 to reference input 56 of voltage regulator 52. A second resistor 58 coupled between power conductor 18 and reference input 56 provides a bias voltage, for example the aforementioned 4 volts, to reference input 56 when a 0 data level, is being transmitted by microprocessor 22. As in transmitter 10, when a digital 1 is sent, 5 volts is output from output PB0, causing the voltage at reference input 56 to rise to 5 volts, in turn causing output 59 of voltage regulator 52 to pull voltage on conductor 18 up to 5 volts. Additionally, any power voltage on conductor 18 representative of a digital bit and initiated by voltage regulator 52 is reinforced by such voltage being applied to reference input 28 of regulator 26. When the data level initiated by output PB0 of microprocessor 22 is removed, the data level on power line 18 reverts to the voltage level applied to reference input 28 from the data source via resistor 34 or the bias voltage from network 36.

Figure 3:
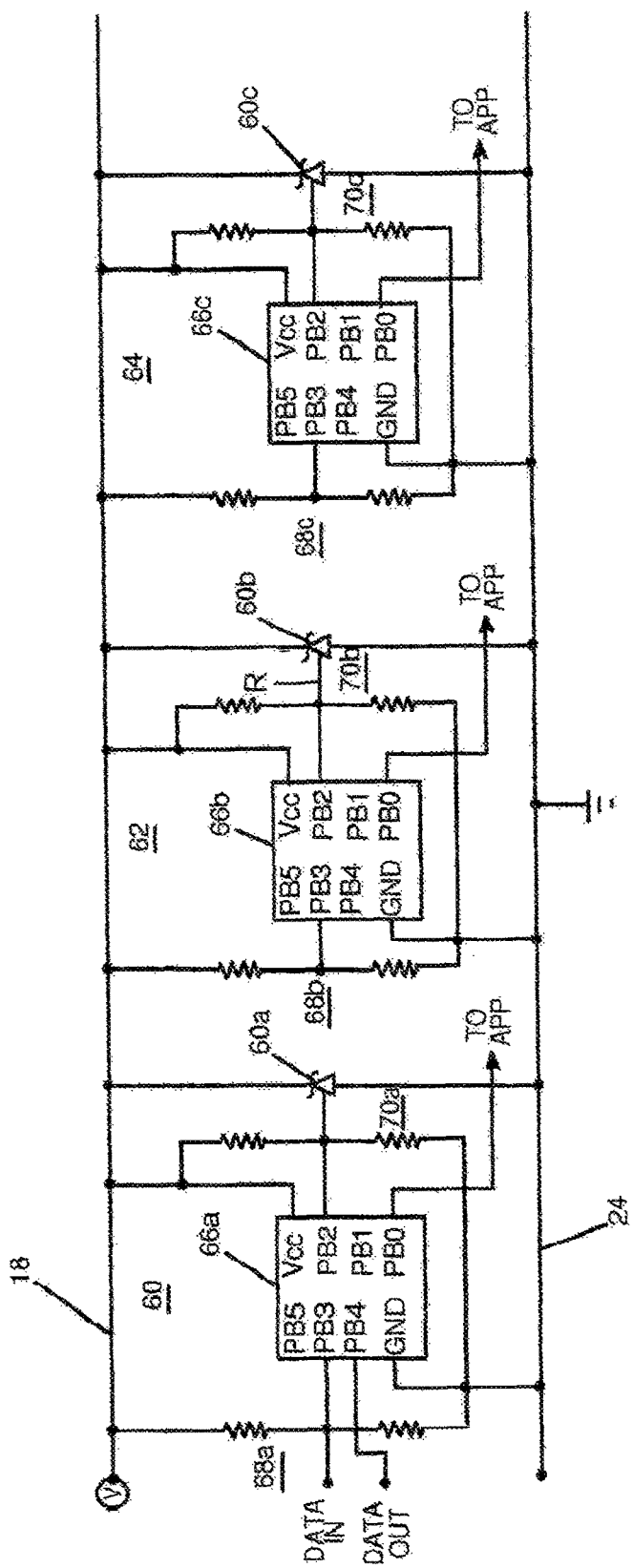
FIG. 3 is a schematic diagram of another embodiment of the instant invention.

Referring now to FIG. 3, an embodiment having multiple transmitters/receivers 60, 62 and 64 connected to the same power line 18 and ground or reference line 24 is shown. Here, voltage regulators are shown as adjustable Zener diodes 60a, 60b and 60c in respective transmitters 60, 62 and 64. Microprocessors 66a, 66b and 66c by way of example only, may be the tiny AT™ microprocessors as described above, each with a Vcc power terminal connected to power line 18 and ground terminal connected to ground or reference line 24. One terminal of each processor, in this instance terminal PB3, may be designated as a data input, and another terminal of each processor, for instance PB2, may be designated as a data output. Voltage divider networks 68a, 68b, and 68c for each transmitter/receiver 60, 62 and 64, respectively, form a biasing network that reduces an input to an acceptable data level, such as the aforementioned 5:1 reduction, and second voltage divider networks 70a, 70b and 70c for each transmitter/receiver 60, 62 and 64, respectively, provide a data voltage output to a reference input R of a respective one of adjustable Zener diodes 60a, 60b and 60c, respectively, as described above. One or more of the transmitter/receivers, such as transmitter/receiver 60, may typically be configured in some embodiments to convert data on power line 18 to 0 and 5 volt levels for data transmission back to another system from where input data originated, such as on terminal PB4, and each receiver may have another pin, such as terminal PB0, to provide data to an application. Data inputs to the transmitter/receivers may be as simple as a switch closure, such as on a fire alarm system, temperature monitoring system and so forth, or may be connected to a computerized system for performing more complicated tasks. Data outputs may also be to applications that are simple, such as illuminating a warning lamp, or more complicated, such as taking a temperature reading and providing a digitized indication of temperature, detecting motion from a motion detector and acting on such motion, such as activating a camera to provide a video stream, or whatever else a developer wishes to do. In addition, each transmitter/receiver need not perform the same function. For instance, one transmitter/receiver may be configured to take a temperature reading, another configured to monitor and report status of a fire alarm, and a third configured to monitor and report status of a motion sensor. Each of the above transmitter/receivers may also be programmed to provide a response, such as controlling an air conditioning/heating system responsive to sensing temperature, activating a fire alarm in response to a fire, and activate a camera and alarm in response to sensed motion.

Since data transmission is bidirectional, half duplex transmission, only one of transmitter/receivers 60, 62 and 64 may transmit at a time, while all may receive data simultaneously. As such, digital information would typically be packetized, with a header containing an address to initialize a specific one of the transmitter/receivers and a footer indicating completion of the transmission. Any conflicts that arise may be handled by a priority system wherein higher priority transmitter/receivers are given an opportunity to transmit while lower priority transmitter/receivers are temporarily disabled until higher priority transmitter/receivers complete their data transmission.

Figure 4:
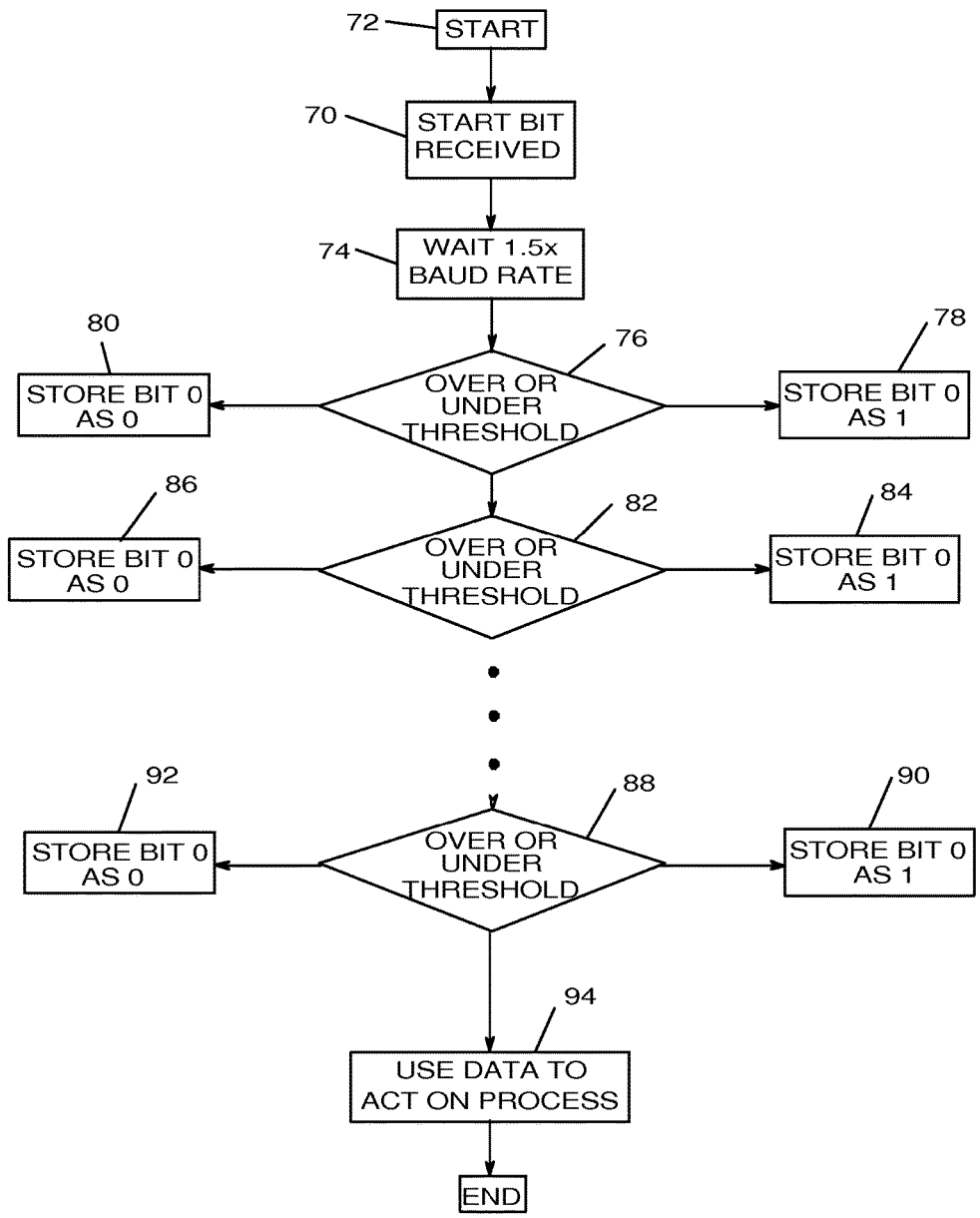
FIG. 4 is a flowchart illustrating transmission of ASCII data by the instant invention.

Referring to FIG. 4, a flowchart of transmission of digital data is shown. By way of example only, transmission of ASCII data is illustrated, along with detection of the ASCII data by a microprocessor. This program may run continuously in a loop, or be started when necessary. Serial transmission of ASCII data begins when a start bit is transmitted that alerts the receiver that a stream of data bits representative of one ASCII character is about to be sent. It is noted that in ASCII transmission, the data line is held at a high logic level and pulled low upon commencement of a start bit. When a start bit occurs, and as indicated at box 70, the query is posed as to whether a start bit has been received. If not, then the program loops back to start box 72. If a start bit has been received, then the program falls through to box 74 where a delay of about 1.5 times the clock rate of the data is initiated in order to sample voltage levels in the middle of each bit so that reliable bit detection is achieved. Thereafter, data samples are taken at about the middle of each bit to ensure reliable detection of data levels. At box 76 the query is posed as to whether the sampled voltage level is over or under the 0.9 threshold that determines whether a sampled voltage level is to be determined to be a digital 0 or 1. If the sampled voltage is over the threshold, then a digital 1 is stored at box 78. If the sampled value is below the threshold, then a digital 0 is stored at box 80. The logic then waits a second delay equal to the width of a data pulse (not shown), putting the sampling time again in the middle of a pulse period, and a second sample is taken at box 82 where the query is posed as to whether the voltage is above or below the threshold. If above, then at box 84 a digital 1 is stored, and if under a digital 0 is stored at box 86. The process is repeated until the $8^{th}$ bit is sampled at box 88 and corresponding high or low bits are stored at boxes 90, 92 respectively. At box 94 the stored data is used to act on a process, take a measurement, return data or do whatever is intended. While ASCII data transmission is shown being transmitted, it is apparent that any form of digital coding may be employed.

Unlike many expressions of data transmission, there is no fixed limit for the speed of data transmission, using this method. Methods that rely on phase delays of AC signals are inherently limited to the carrier frequency of the AC power, which is typically 50 to 60 Hz. The technique described above may be successfully applied at much higher frequencies, which are limited by other factors, but may exceed 75 KHz, or more than 1000 times faster than AC modulated data. In addition, construction of the transmitter/receivers is very inexpensive using surface mounted components, costing only a few cents for each one.

Having thus described our invention and the manner of its use, it should be apparent to those skilled in the relevant arts that incidental changes may be made thereto that fairly fall within the scope of the following appended claims, wherein I claim:

1. A method for transmitting digital signals using only one power conductor and a ground conductor, said method comprising:
   applying a current limited non-zero DC power voltage to said one power conductor,
   regulating said current limited non-zero DC power voltage on said one power conductor using a voltage regulator having a first reference input, with a non-zero DC reference voltage taken from said current limited non-zero DC power voltage applied to said first reference input that establishes a voltage level of said current limited non-zero DC power voltage on said one power conductor,
   varying said non-zero DC reference voltage applied to said first reference input of said voltage regulator in accordance with said digital signals, thereby varying and regulating said current limited non-zero DC power voltage on said one power conductor in accordance with said digital signals,
   in a receiver of said digital signals, connecting said one power conductor carrying regulated and varied said current limited non-zero DC power voltage to a power input of a microprocessor selected to be powered within a range of said regulated and varied current limited non-zero DC power voltage,
      separating said digital signals from said regulated and varied current limited non-zero DC power voltage, and:
      applying said digital signals to an input of said microprocessor, thereby simultaneously powering said microprocessor and transmitting said digital signals to said microprocessor using only said one power conductor and said ground conductor.

2. The method of claim 1 wherein said regulating said current limited non-zero DC power voltage on said one power conductor using a voltage regulator further comprises using a first shunt voltage regulator as a transmitter, and connecting said one power conductor to a first regulated output terminal of said first shunt voltage regulator.

3. The method of claim 2 wherein using said first shunt voltage regulator further comprises using an adjustable Zener diode as said first shunt voltage regulator.

4. The method of claim 1 wherein said non-zero DC reference voltage applied to said first reference input that establishes a voltage level of said current limited non-zero DC power voltage on said one power conductor further comprises applying a bias voltage taken from said current limited non-zero DC power voltage to said first reference input, and varying said bias voltage in accordance with said digital signals.

5. The method of claim 4 wherein said varying said bias voltage in accordance with said digital signals further comprises selecting a voltage swing of said bias voltage to be at about 1 volt so that said regulated and varied current limited non-zero DC power voltage on said one power conductor has a voltage swing of about one volt in accordance with said digital signals.

6. The method of claim 5 wherein said selecting a voltage swing of said bias voltage to be at about 1 volt so that said regulated and varied current limited non-zero DC power voltage on said one power conductor has a voltage swing of about one volt in accordance with said digital signals further comprises selecting said bias voltage to be at about a middle of a power voltage operating range of said microprocessor.

7. The method of claim 4 wherein said separating said digital signals at said receiver of digital signals from said regulated and varied current limited non-zero DC power voltage on said one power conductor further comprises reducing said regulated and varied current limited non-zero DC power voltage and applying a reduced said regulated and varied current limited non-zero DC power voltage to a threshold wherein a reduced said regulated and varied current limited non-zero DC power voltage above said threshold is designated as a digital HIGH and a reduced said regulated and varied current limited non-zero DC power voltage below said threshold is designated as a digital LOW.

8. The method as set forth in claim 7 wherein said reducing said regulated and varied current limited non-zero DC power voltage further comprises reducing said regulated and varied current limited non-zero DC power voltage to have a voltage swing of about 0.2 volts, and further wherein said threshold is selected to be in a middle of said voltage swing of about 0.2 volts.

9. The method of claim 7 further comprising, at said receiver of digital signals, connecting a second regulated output terminal of a second voltage regulator to said one power conductor, with a second reference input of said second voltage regulator responsive to said bias voltage and an output of said microprocessor, thereby allowing half duplex communication between said voltage regulator and said second voltage regulator.

10. The method of claim 9 further comprising providing a plurality of receivers of said digital signals, whereby half duplex communications are enabled between said voltage regulator and any of said plurality of digital receivers.

11. Apparatus for transmitting digital signals between a transmitter and a receiver using only a DC power conductor and a ground conductor comprising:
   a DC power source that provides a current limited DC power voltage to said DC power conductor, said transmitter further comprising:
      a first voltage regulator further having a first voltage reference terminal to which a DC reference voltage and the digital signals are applied, said DC reference voltage taken from said current limited DC power voltage,
      said first voltage regulator having a first voltage regulator terminal connected to said DC power conductor, for regulating a voltage level of said current limited DC power voltage applied to said DC power conductor responsive to said DC reference voltage and said digital signals and developing said current limited DC power voltage on said DC power conductor that is varied in accordance with said digital signals,
   said receiver comprising:
      a microprocessor selected to be powered by a varied said current limited DC power voltage, and having a power terminal to which said varied current limited DC power voltage is applied,
      a ground terminal connected to said ground conductor,
      a digital signal separator for separating said digital signals from said current limited DC power voltage and providing said digital signals as an output, an input to said microprocessor, said input receiving said digital signals from said digital signal separator.

12. The apparatus of claim 11 wherein said first voltage regulator is a first shunt voltage regulator.

13. The apparatus of claim 12 wherein said first shunt voltage regulator is an adjustable Zener diode.

14. The apparatus of claim 11 wherein said DC reference voltage is provided by a DC bias voltage network connected to said DC power conductor so that said DC reference voltage is a lower voltage than said current limited DC power voltage.

15. The apparatus of claim 14 wherein said DC bias voltage network is configured to provide said current limited DC power voltage that is varied in accordance with said digital signals with a DC power voltage swing of about 1 volt.

16. The apparatus of claim 15 wherein said DC reference voltage is selected to be about in a middle of a power voltage operating range of said microprocessor.

17. The apparatus of claim 15 further comprising a voltage reduction network connected to said DC power conductor and having an output connected to said input to said microprocessor, for reducing said DC power voltage swing of about 1 volt and applying a reduced said DC power voltage swing to said input to said microprocessor.

18. The apparatus of claim 17 further comprising a second voltage regulator at said receiver, said second voltage regulator having a second voltage regulator terminal coupled to said DC power conductor and a second voltage reference terminal to which a DC reference voltage taken from said DC power conductor and an output from said microprocessor are applied, thereby enabling half duplex communication between said first voltage regulator and said receiver.

19. The apparatus of claim 18 further comprising a plurality of receivers, each said receiver of said plurality of receivers coupled for said half duplex communication with said first voltage regulator and said second voltage regulator of any of said plurality of receivers.

* * * * *